United States Patent [19]

Schwartz et al.

[11] Patent Number: 4,795,930
[45] Date of Patent: Jan. 3, 1989

[54] STEPPING MOTOR COIL CORE AND STATOR ASSEMBLY FOR A TIMEPIECE

[75] Inventors: Herbert Schwartz, Wurmberg; Gerhard Stotz, Niefern-Öschelbronn, both of Fed. Rep. of Germany

[73] Assignee: Timex Corporation, Middlebury, Conn.

[21] Appl. No.: 128,139

[22] Filed: Dec. 3, 1987

[51] Int. Cl.$^4$ .......... H02K 37/00; G04F 5/00
[52] U.S. Cl. .................. 310/49 R; 310/43; 368/157; 368/160
[58] Field of Search ........... 310/40 MM, 49 R, 43, 310/83, 156, 254; 368/157, 160, 204

[56] References Cited

U.S. PATENT DOCUMENTS

| Re. 29,403 | 9/1977 | Yamazaki | 58/23 D |
|---|---|---|---|
| 2,909,685 | 10/1959 | Szabo | 310/42 |
| 4,297,838 | 11/1981 | Wanatabe | 368/76 |
| 4,361,772 | 4/1982 | Fukushima | 310/49 |
| 4,398,107 | 7/1973 | Fukushima | 310/49 |
| 4,636,087 | 1/1987 | Suzuki | 368/185 |
| 4,647,218 | 3/1987 | Wuthrich | 368/157 |
| 4,679,944 | 7/1987 | Sedlak | 368/157 |
| 4,703,208 | 10/1987 | Burkhardt et al. | 310/49 R |

FOREIGN PATENT DOCUMENTS 0098910 8/1979 Japan .................. 310/49 R

Primary Examiner—Patrick R. Salce
Assistant Examiner—Judson H. Jones
Attorney, Agent, or Firm—William C. Crutcher

[57] ABSTRACT

In a wristwatch movement with a stepping motor with a rotor connected to drive a gear train which periodically advances the hands of the wristwatch, the stepping motor has a flat stator piece secured in a plastic movement frame. A coilcore assembly comprising a flat hook-shaped core plate having a straight core portion of uniform width with a coil inserted over the free hand of the core portion is secured to the stator so that opposite ends of the hook-shaped member overlap opposite ends the stator to complete a path for the magnetic flux. The hook-shaped coil core is placed on top of the stator during assembly and is held down by insulated clamping means such as a bridge or circuit board bolted to the frame at the time of final assembly. Preferably, the stator and coil core member are located with respect to one another by plastic studs integral with the frame extending through aligned holes in the stator and coil core. Some of the studs receive bolts which hold the clamping means to the frame.

7 Claims, 5 Drawing Sheets

STEPPING MOTOR COIL CORE AND STATOR ASSEMBLY FOR A TIMEPIECE

BACKGROUND OF THE INVENTION

This invention relates to an improved stepping motor for a timepiece, such as a quartz wristwatch. More particularly, it relates to an improved coil core and stator assembly for a wristwatch stepping motor.

Stepping motors for wristwatches are well known in the art and comprise a rotor with a permanent magnet, usually two pole, having a pinion meshing with a gear train and connected to drive the hands of the watch. The stepping motor is driven by periodic pulses, which in the case of a bipolar rotor are pulses of alternating polarity, furnished by an electronic circuit. Such a circuit is well known in the art and has a quartz-controlled oscillator, a dividing circuit for reducing the frequency, and a driving circuit which operates solid state switches controlling the application of drive pulses from a battery in the wristwatch.

Many arrangements have been suggested for reducing the thickness of a wristwatch movement while, at the same time, making the movement easy to assemble and employing the simplest parts in the movement. The arrangement, construction and assembly of the stepping motor is an important consideration in reducing the thickness of the timepiece movement. Every stepping motor requires a rotor, a stator cooperating with the rotor, a coil connected to the electronic circuit for developing magnetic flux, and a coil cure which is part of, or which is connected in magnetic circuit with the stator.

In order to simplify assembly, it has been proposed to make the coil core separate from the stator and to provide a coil wound on the coil core or placed on it as a prewound coil. The use of flat piece parts with minimum of machining is desirable to reduce the cost of the movement. A minimum number of parts which are easy to assembly is another aim. The separate parts need to be properly aligned and held securely in the frame. A review of the prior art follows which highlights the advantages achieved by the present invention.

U.S. Pat. No. 2,909,685—Szabo illustrates a single flat part comprising stator and coil core, but requiring winding the coil around the core, which is an expensive procedure.

U.S. Pat. No. 4,398,107—Fukushima and U.S. Pat. No. 4,361,772 illustrate a one-piece stator for a stepping motor attached to a separate core member by bolts, again requiring winding a coil on the core.

U.S. Pat. No. Re. 29,403—Yamazaki illustrate a stepping motor with coil and coil core overlapping especially machined areas on the stator piece and bolted thereto.

U.S. Pat. No. 4,297,838—Watanabe et al. disclose an effort to reduce the thickness of the timepiece by locating the coil core between the stator and the dial and providing a bent portion of the coil core to overlap part of the stator.

U.S. Pat. No. 4,647,218—Wuthrich assigned to applicant's assignee discloses a coil core member aligned with a stator member and having a bent portion lying on top of the stator. The added machining step of providing a bent or offset portion of the stepping motor core or stator is an extra manufacturing step which increases the cost of the movement.

U.S. Pat. No. 4,679,944—Sedlak et al issued July 14, 1987 describes a U-shaped combined stator and core member in which a prewound coil can be placed on the end of a core with a magnetic circuit completed by a separate piece overlapping the aforesaid member. Although this reduces the thickness of the stepping motor (except for the overlapping piece), the U-shaped member is expensive to manufacture.

Accordingly, one object of the present invention is to provide an improved stepping motor coil core and stator assembly which is easy to assemble and which provides a thin wristwatch movement.

Another object of the invention is to provide an improved stepping motor assembly which utilizes flat piece parts of inexpensive simple construction for the coil core and stator.

Another object of the invention is an improved stepping motor in which the parts are held in proper alignment in the frame.

SUMMARY OF THE INVENTION

Briefly stated, the invention comprises an improvement in a stepping motor for a timepiece movement with a plastic frame, the improvement comprising a rotor with a permanent magnet and a gear pinion connected to drive a gear train rotatably supported in the frame, a stator adapted to cooperate with the rotor and comprising a flat stator plate of magnetically permeable material disposed in the frame and defining several stator locating holes, a coil core assembly comprising a substantially hook-shaped flat core plate of magnetically permeable material with a straight core portion of uniform width and a coil threaded over the core portion, the core plate also defining several coil core locating holes, the opposite ends of the core plate being disposed on and overlapping opposite ends of the stator plate, one or more plastic locating studs extending from the frame into the above mentioned locating holes, insulated clamping means such as a plastic bridge member bearing down upon portions of the core plate, and bolts securing the clamping means to the frame, preferably extending into one or more of the locating studs.

DRAWINGS

The invention, both as to organization and the method of practice, together with further objects and advantages thereof, will best be understood by reference to the following specification, taken in connection with the accompanying drawings, in which.

DESCRIPTION OF THE PREFERRED EMBODIMENT

Figure 1:
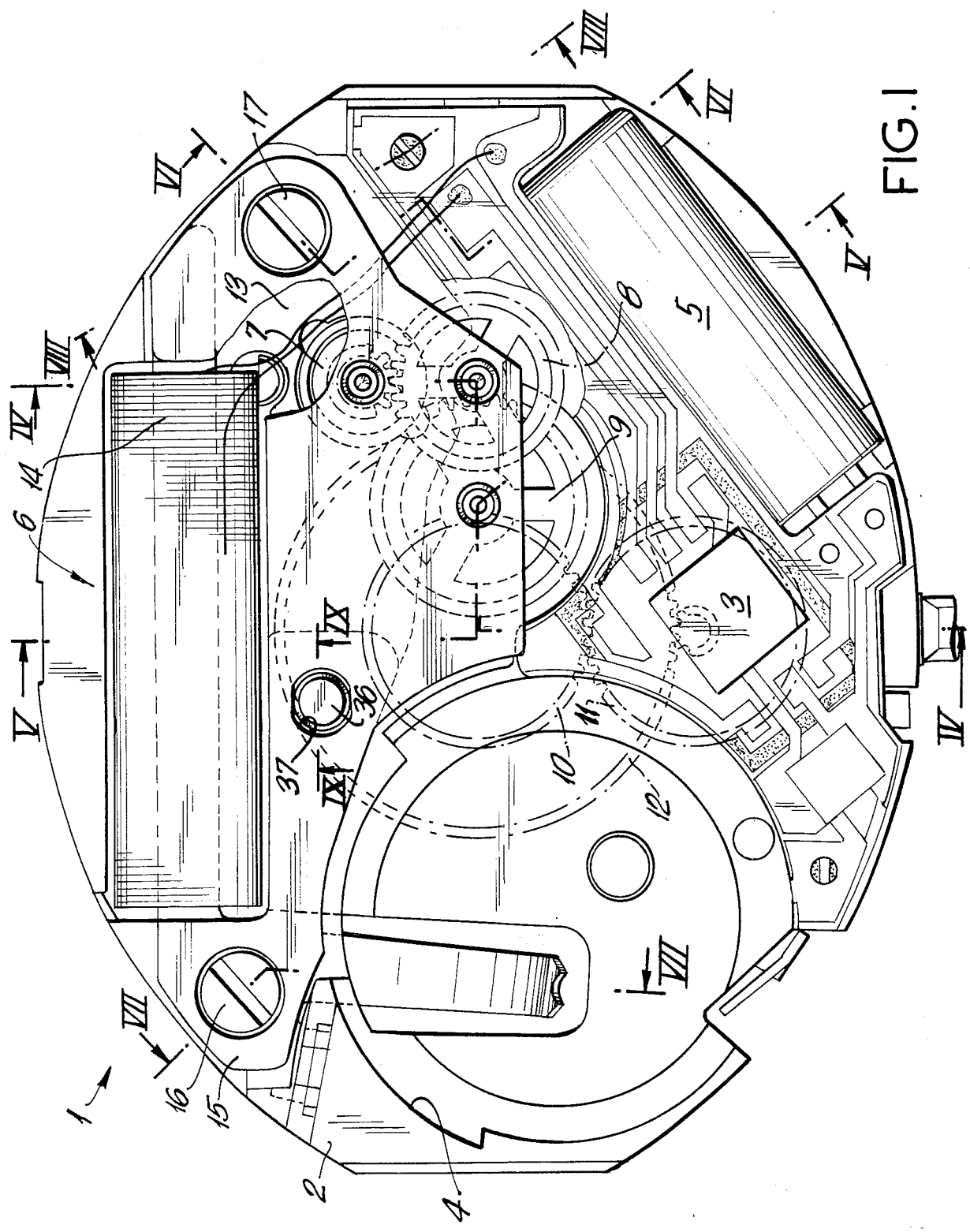
FIG. 1 is a bottom plan view of a wristwatch movement without the case.

Referring to FIG. 1 of the drawing, a timepiece movement is shown generally at 1 and comprises a plastic frame 2, adapted to fit into a timepiece case (not shown) for subsequent fitting with a dial and hands (not shown). The movement 1 includes an electronic circuit 3 which, when connected with a battery (not shown) fitting in a recess 4 in the plastic frame 2 and when connected to a quartz crystal 5 will supply periodic driving pulses to a stepping motor indicated generally at 6. The stepping motor has a rotor assembly 7 which is connected to drive a gear train comprising a second wheel assembly 8, a third wheel assembly 9, a center wheel 10, a minute wheel assembly 11, and a hour wheel 12. The foregoing designation of gear members and wheel assemblies is more or less arbitrary and the number of gears varies from one movement to the next, but essentially is a gear train of meshing gear members rotatably disposed in the frame 2 and driven by rotor 7 of the stepping motor 6.

Stepping motor 6 is comprised of a stator 13 disposed in the frame, and a coil core assembly 14 disposed on top of stator 13. A plastic bridge member 15 serves as means for clamping the coil core assembly 14 and stator 13 to frame 2, herein designated "clamping means." Bridge 15 is secured to frame 2 by means of bolts 16, 17.

Figure 2:
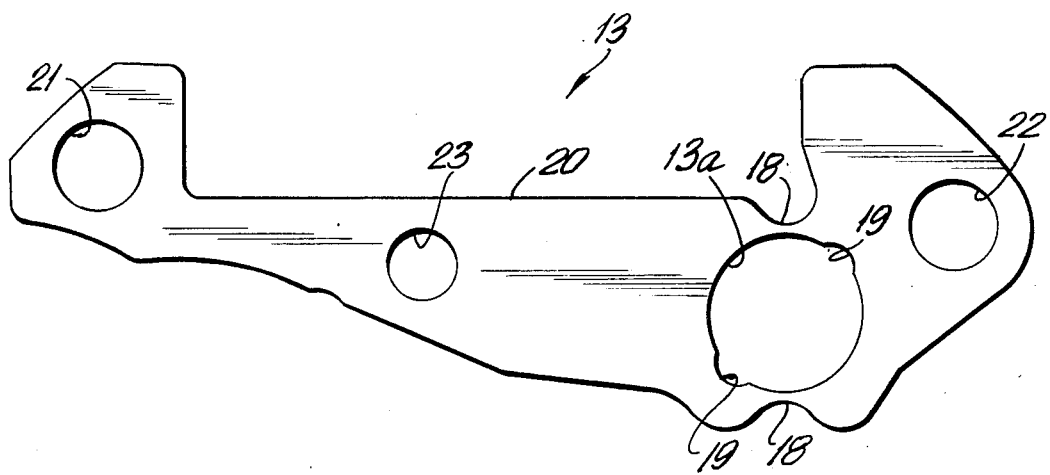
FIG. 2 is a plan view of a stator used in the improved stepping motor.

Refering to FIG. 2 of the drawing, a stator in accordance with the present invention comprises a flat plate of magnetically permeable material which defines a hole 13a for receiving the permanent magnet of the rotor, a pair of reduced cross section areas 18 adapted to saturate during a driving pulse and a pair of diametrically opposed notches 19 for arresting the rotor in a preferential angular position between pulses. Stator 13 also includes a roughly rectangular notch 20 providing a space for the stepping motor coil, a pair of larger stator locating holes 21, 22 on opposite ends thereof and a smaller stator locating hole 23 along a central portion thereof.

In some cases, the stator may be made in two pieces by separating the stator around hole 13a in the vicinity of the reduced area sections 18, this type of two piece stator being well-known in the art.

Figure 3:
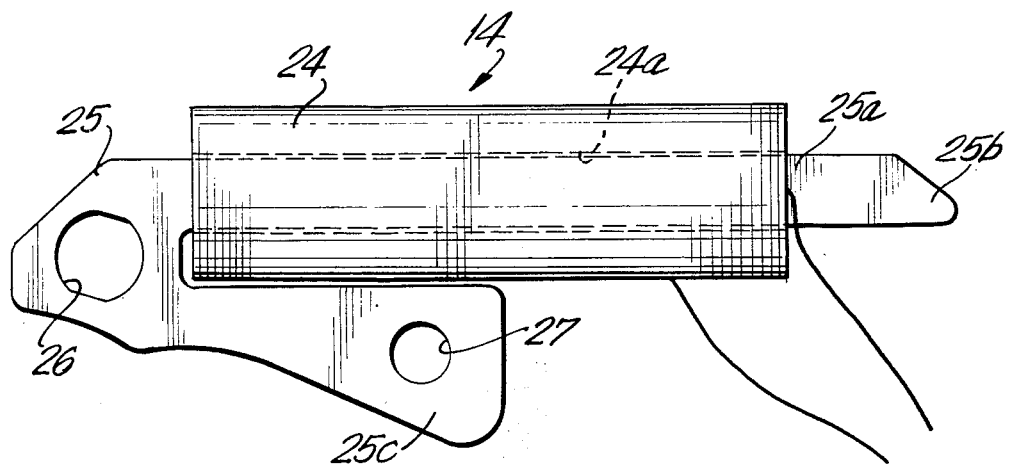
FIG. 3 is a plan view of a coil core assembly used in the improved stepping motor.

Referring to FIG. 3 of the drawing, the coil core assembly 14 comprises a coil 24 and a core plate 25. The coil 24 is a self-supporting or "bobbinless" coil of substantially rectangular cross section with a substantially rectangular center hole 24a. The core plate 25 is a roughly hook-shaped flat plate of magnetically permeable material with a straight core portion 25a of uniform width terminating in an end 25b. The other end, or hook portion 25c, terminates about half way down the axial length of the coil 24, while the core portion 25a is longer than the axial length of coil 24, so that the terminating end 25b can make overlapping magnetic circuit with the stator as will be described. Core plate 25 further defines a larger coil core locating hole 26 with flat sides for adjustment and a smaller coil core locating hole 27. The coil core assembly 14 is preassembled by prewinding coil 24 without a bobbin as a self-supporting air coil and then threading it over the end of the core portion 25a, where it is held in place by friction fit. The threading process is facilitated by the rounded rounded level on the end 25b.

Figure 4:
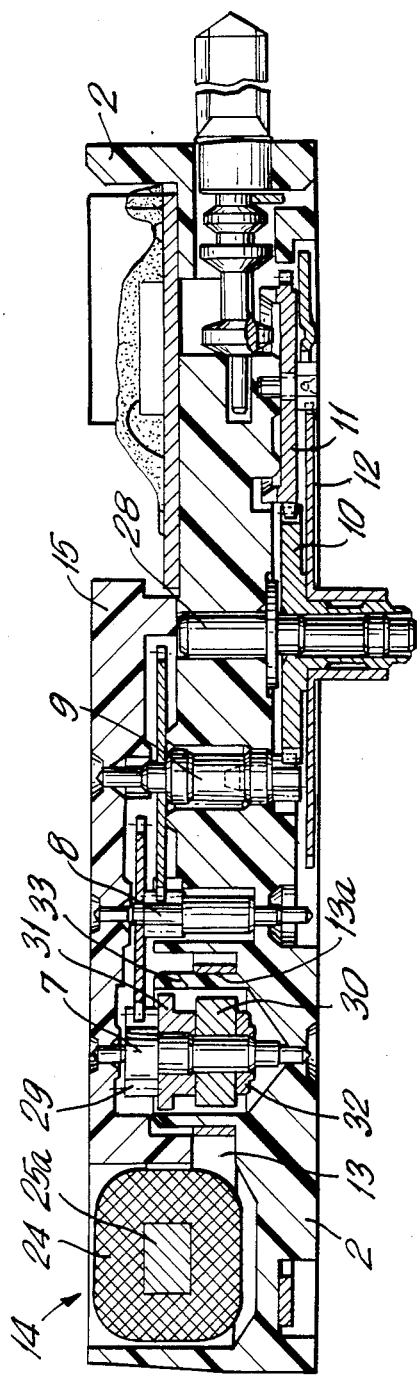
FIGS. 4 through 9 are elevation views, in cross section, taken along lines IV—IV through IX—IX respectively of FIG. 1.

Referring now to the horizontal cross section of FIGS. 4-9 which are taken along various section lines of FIG. 1 and noted by Roman numerals corresponding to the figure numbers, FIG. 4 illustrates most of the gear train members corresponding to those noted on FIG. 1. The plastic frame 2 and the bridge 15 are secured together and have suitable aligned bores so as to rotatably journal between them the rotor assembly 7, the second wheel assembly 8, and the third wheel assembly 9. A fixed center post 28 secured in the frame projects towards the dial side and rotatably journals the center wheel 10 and the hour wheel 12 on coaxial sleeves around the center post 26. Minute wheel assembly 11 is driven by center wheel 10 and drives hour wheel 12.

Rotor 7 is an assembly comprising a single piece rotor gear pinion and shaft 29, and a circular permanent bipolar magnet 30 held on the shaft by a spacer washer 31 and a retainer washer 32 forced onto the pinion shaft. Rotor 7 is disposed within a cylindrical plastic wall member 33 which is an integral part of frame 2. The stator 13 is located in a recess of frame 2 with hole 13a surrounding the cylindrical wall 33. Coil core assembly 14 lies with the core portion 25a on top of stator 13.

Figure 5:
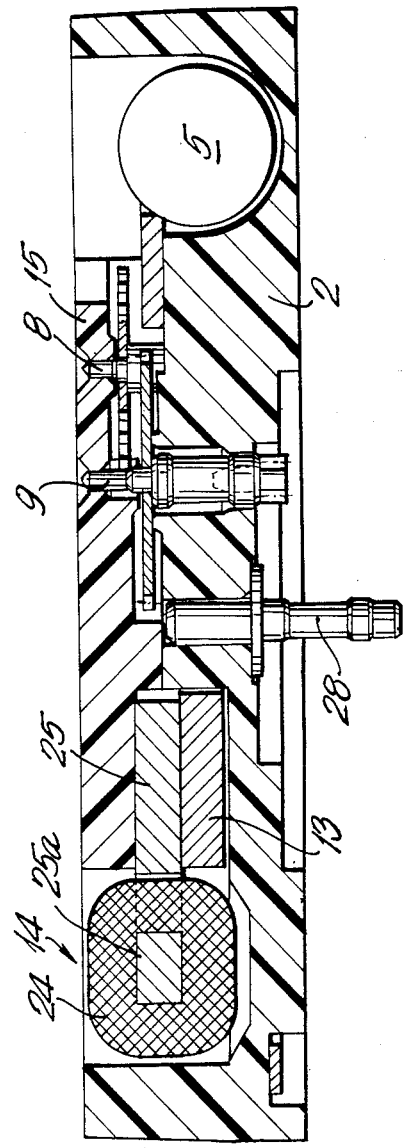

Referring to FIG. 5, the cross section of the frame 2 and bridge 15 are shown. The bridge 15 clamps the overlapping plate portion of stator 13 and core plate 25 to the frame. The center wheel 10 and hour wheel 12 are not shown.

Figure 6:
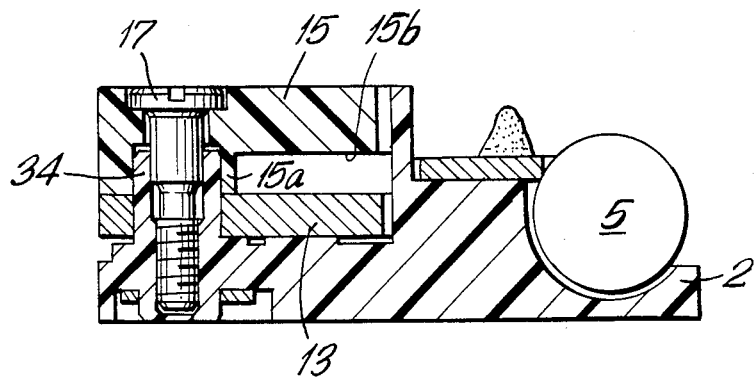

Referring to FIG. 6 of the drawing, a section is shown through the right hand bolt 17 of FIG. 1. Frame 2 is provided with several integral plastic studs which serve to locate the stator and the coil core assembly with respect to each other and with respect to the frame. One such stud 34 is shown in FIG. 6 as a hollow stud which receives the bolt 17 by means of internal threads. Bridge 15 includes a portion 15a bearing directly upon stator plate 13 adjacent stud 34, and another portion 15b bearing upon the terminating end of the coil core to hold it in place (see FIG. 8).

Figure 7:
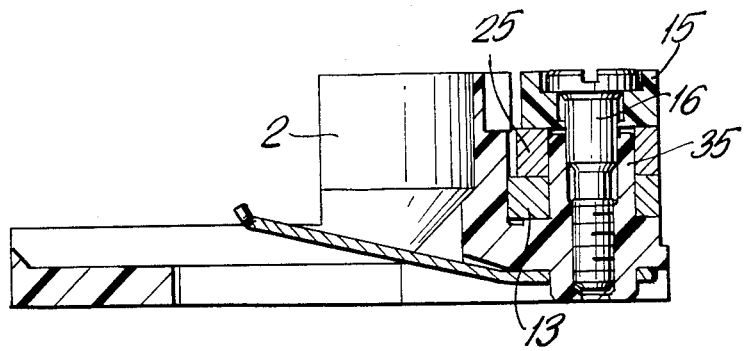

FIG. 7 illustrates a cross section through the left hand bolt 16 of FIG. 1. Another integral plastic hollow stud 35 receives the threaded end of bolt 16. Bridge 15 receives the head of bolt 16 and serves a clamping means to secure core plate 25 and stator 13 to the frame 2. It will be noted that the height of stud 35 is slightly less than the combined thickness of the two flat plates 13, 25, so that when bolt 16 is tightened, clamping of the permeable stator members together will establish a good path for magnetic flux.

Figure 8:
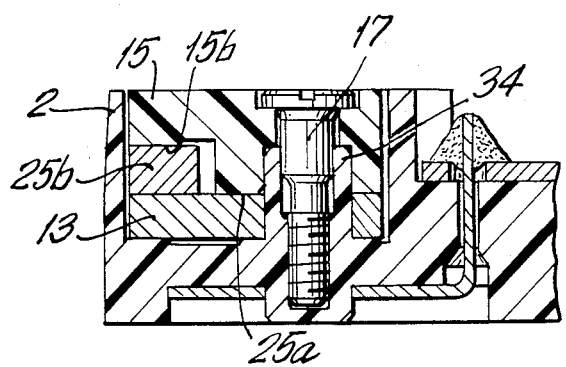

Referring to FIG. 8 of the drawing which is another cross section through holding bolt 17 but taken in a different viewing direction, the end 25b of the coil core portion 25a can be seen resting upon stator 13 and held in place by portion 15b of the bridge bearing upon end 25b. Bolt 17 when tightened within the plastic stud 34 secures bridge 15 to the frame, with portion 25a clamping stator 13 to the frame and portion 25b clamping coil core and stator together and against the frame.

Figure 9:
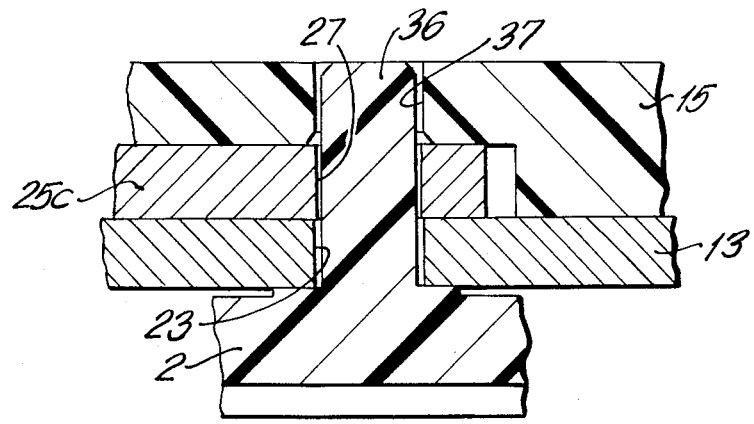

FIG. 9 illustrates a cross section at a midpoint of stator 13. A solid smaller plastic stud 36 which is integral with the frame 2 extends through the smaller stator locating hole 23 and the smaller coil core locating hole in the hook-shaped end 25c.

A hole 37 in the bridge receives stud 36 so that the bridge may clamp the core and stator to the frame when bolts 16, 17 are tightened.

Figure 10:
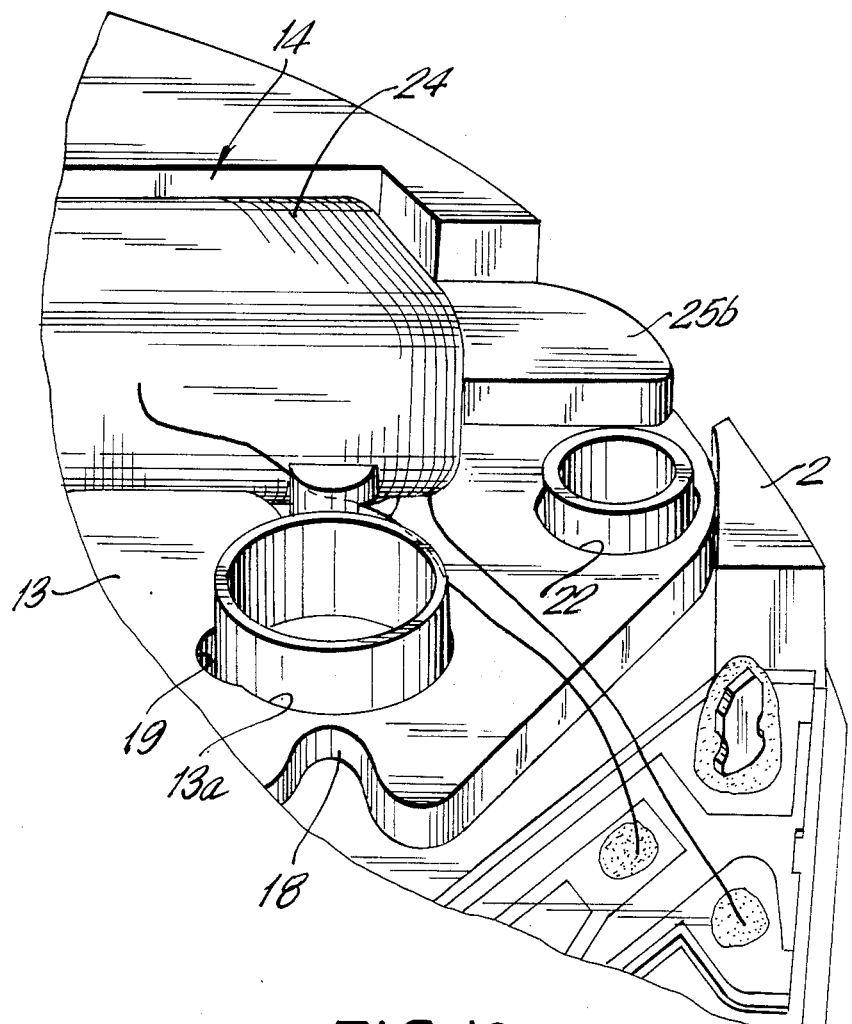
FIG. 10 is a perspective view of a portion of the watch frame, stepping motor, coil core and stator assembly.

FIG. 10 illustrates the method of assembly and connection of the coil. Frame 2 is provided with a small hook 2a in the vicinity of the stepping motor to hold the coil leads. First, the stator plate 13 is laid in the frame 2, located by stator locating holes such as 21, 22, 23. Next the coil core assembly 14 is laid on top of the stator. At the left hand end (FIG. 7) stator and core are aligned and located by stud 35. At the right hand end, core end 25b overlaps stator 13. The rotor and other gear train members are inserted in the frame, and the coil leads are connected to the circuit board and held in place by hook 2a. Next the bridge 15 is added and clamped to the frame by bolts 17, 16. In this manner a simple assembly of the stepping motor is achieved, while the stepping motor parts are manufactured as flat piece parts of simple construction.

The means for clamping the coil core assembly and stator to the frame need not necessarily be a bridge which also journals the gear members. Other types of clamping means might comprise a portion of a circuit board or a separate non-magnetic or insulating piece designed for this purpose but separate from the bridge.

While there has been described what is considered the preferred embodiment of the invention, other modifications will occur to those skilled in the art, and it is desired to secure appended claims all such modifications as fall within the true spirit and scope of the invention.

We claim:

1. In a timepiece movement having a plastic frame, a plurality of meshing gear members rotatably disposed in said frame to provide a gear train, a stepping motor, and an electronic circuit adapted to supply periodic electrical pulses to said stepping motor, the improvement in said stepping motor comprising:
   a rotor having a permanent magnet and a gear pinion connected to drive said gear train;
   a stator adapted to cooperate with said rotor and comprising a flat stator plate of magnetically permeable material disposed in said frame and defining a plurality of stator locating holes;
   a coil core assembly comprising a substantially hook-shaped flat core plate of magnetically permeable material having a straight core portion of substantially uniform width and a coil having an axial length shorter than said core portion threaded over the end of said core portion, said core plate defining a plurality of coil core locating holes, opposite ends of said core plate being disposed on and overlapping opposite ends of said stator plate;
   at least one plastic stud integral with and extending from said frame through a said stator locating hole and at least partially into a coil core locating hole;
   insulating clamping means comprising a bridge which rotatably journals one end of said rotor, said insulated clamping means having portions bearing upon overlapped portions of said core plate and said stator near one of said studs to hold them in the frame; and
   at least one bolt extending into one of said plastic studs and securing said clamping means to said frame.

2. The improvement according to claim 1, wherein there are two of said plastic studs extending through stator locating holes which are defined in opposite ends of said stator plate.

3. The combination according to claim 2, wherein one of said studs extends into a coil core locating holes, and wherein the end of said coil core portion overlaps a portion of said stator plate adjacent the other of said studs and is held to the stator plate solely by said clamping means.

4. The improvement according to claim 2, wherein there is at least one additional stud disposed in a said stator locating hole and a said coil core locating hole so as to help align the coil core with respect to the stator.

5. The improvement according to claim 1, wherein a first plastic stud is hollow and extends through a first stator locating hole in one end of the stator and also through a first coil core locating hole, wherein a second plastic stud is hollow and extends through a second stator locating hole in the other end of the stator, and wherein first and second bolts extend into said first and second hollow studs.

6. The improvement according to claim 5, wherein a third smaller stud extends through a third stator locating hole and a second coil core locating hole defined in the hook-shaped portion of the coil core to align the coil core and stator.

7. In a timepiece movement having a plastic frame, a plurality of meshing gear members rotatably disposed in said frame to provide a gear train, a stepping motor, and an electronic circuit adapted to supply periodic electrical pulses to said stepping motor, the improvement in said stepping motor comprising:
   a rotor having a permanent magnet and a gear pinion connected to drive said gear train;
   a stator adapted to cooperate with said rotor and comprising a flat stator plate of magnetically permeable material disposed in said frame and defining a plurality of stator locating holes;
   a coil core assembly comprising a substantially hook-shaped flat core plate of magnetically permeable material having a straight core portion of substantially uniform width and a coil having an axial length shorter than said core portion threaded over the end of said core portion, said core plate defining a plurality of coil core locating holes, opposite ends of said core plate being disposed on and overlapping opposite ends of said stator plate;
   a first plastic stud integral with said frame and extending through a first of said stator locating holes at one end of the stator and at least partially through a first of said core locating holes;
   a second plastic stud integral with said frame and extending through a second of said stator locating holes near the middle of said stator and at least partially through a second of said core locating holes defined in said hook-shaped core portions;
   a third plastic stud integral with said frame and extending through a third of said stator locating holes at the other end of the stator;
   clamping means comprising a bridge which rotatably journals one end of said rotor and having portions bearing upon overlapped portions of said core plate and stator; and
   a plurality of bolts screwed into selected studs to secure the clamping means to the frame.

* * * * *